United States Patent [19]

Stauffer

[11] 4,359,636
[45] Nov. 16, 1982

[54] DETECTOR BALANCE APPARATUS AND METHOD EMPLOYING SELECTIVE MASKS

[75] Inventor: Norman L. Stauffer, Englewood, Colo.

[73] Assignee: Honeywell Inc., Minneapolis, Minn.

[21] Appl. No.: 213,438

[22] Filed: Dec. 5, 1980

[51] Int. Cl.³ .............................................. G01J 1/36
[52] U.S. Cl. ................................ 250/204; 250/237 R; 250/239
[58] Field of Search ............... 250/201, 204, 209, 216, 250/237 R, 239, 578; 354/25

[56] References Cited

U.S. PATENT DOCUMENTS 4,238,157  12/1980  Strauch et al. ................. 250/237 R
4,318,135   3/1982  Allis et al. ........................ 250/239

Primary Examiner—David C. Nelms
Attorney, Agent, or Firm—Charles J. Ungemach

[57] ABSTRACT

Apparatus and method for adjusting the outputs of radiation responsive detectors to correct for mismatching.

8 Claims, 12 Drawing Figures

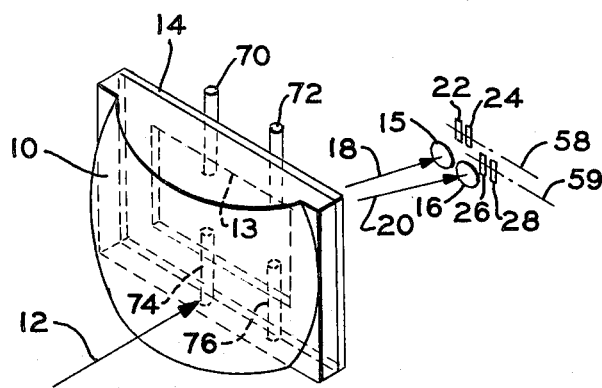
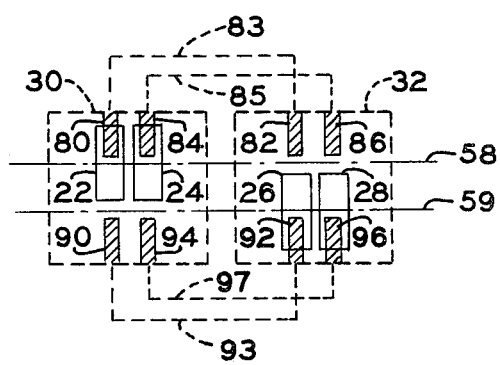
FIG. 4
FIG. 4a
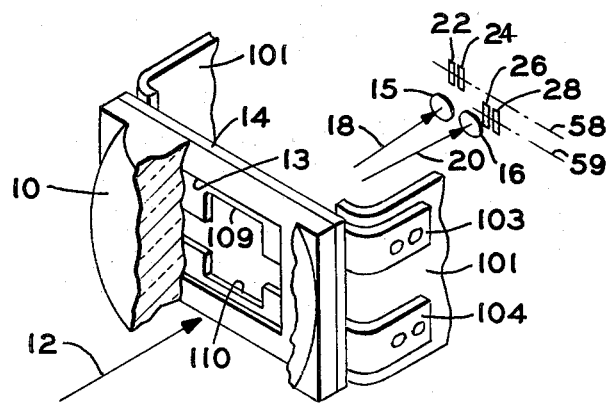
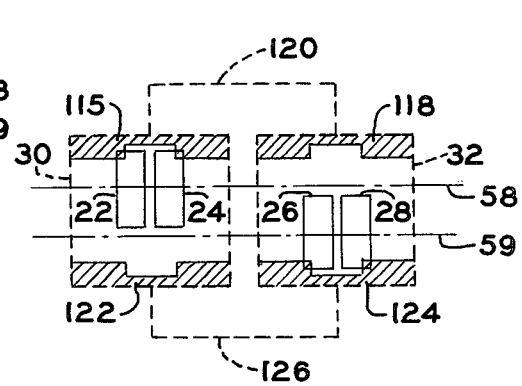
FIG. 5
FIG. 5a
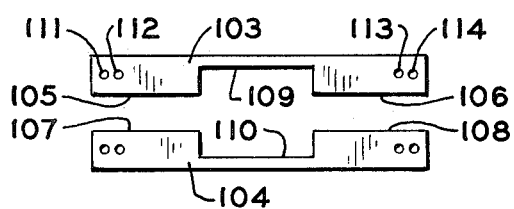
FIG. 6

DETECTOR BALANCE APPARATUS AND METHOD EMPLOYING SELECTIVE MASKS

BACKGROUND OF THE INVENTION

In copending applications of Norman L. Stauffer, Ser. No. 85,821, filed Oct. 17, 1979, now U.S. Pat. No. 4,309,603 and James H. Frazier, Ser. No. 212,930, filed Dec. 4, 1980, and John C. Wittenberger, Ser. No. 212,918, filed Dec. 4, 1980, certain auto focus circuitry is disclosed for use on low cost cameras utilizing very few radiation responsive detectors.

In using a small number of detectors, it becomes extremely important that the outputs of the detectors be closely matched since these systems operate on the principle that as the focus lens moves changing the radiation received by the individual detectors, the proper focus position is reached when the outputs of two detectors are substantially equal. If the detectors are mismatched, the point at which the outputs become equal will not necessarily coincide with the position of best focus for the lens.

SUMMARY OF THE INVENTION

The apparatus of the present invention operates to adjust the outputs of the detectors so as to assure that they are as closely matched as possible thus assuring that their use in a range finding system will produce optimum results. More specifically, the present invention utilizes moveable masking means to block a small portion of the radiation striking one or both of the detectors in each pair of detectors utilized so that if one of the detectors produces a greater output for a given amount of radiation, a portion of the radiation striking that detector may be masked and thus bring the output of such detector down so as to equal the output of the other detector.

BRIEF DESCRIPTION OF THE DRAWINGS

FIG. 4 shows, in a view like FIG. 1, one embodiment of a system in which four masking members are employed with an offset detector array;

FIG. 4a shows the detectors of FIG. 4 and the position of the shadows of the masking members thereon;

FIG. 5 shows a cutaway view of an alternate embodiment of the invention utilizing a sliding tape to produce the masking of the detector pairs;

FIG. 5a shows detectors of FIG. 5 and the position of the shadows of the masking tape thereon;

FIG. 6 shows the configuration of the masking tape members of FIG. 5; and

DETAILED DESCRIPTION OF THE PREFERRED EMBODIMENT

Figure 1:
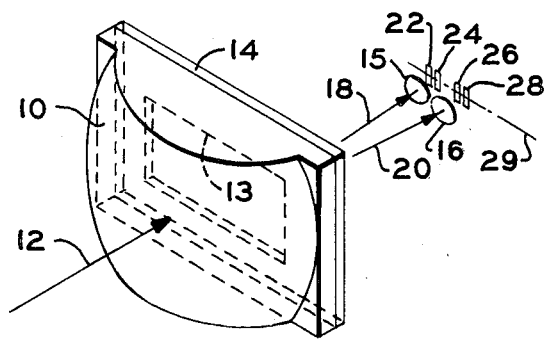
FIG. 1 shows a view of the focus lens, two lenslets and two pairs of detectors as used in the systems of the prior art.

FIG. 1 shows the arrangement of the focus lens, the lenslets and the detector pairs prior to any attempt to match the detector outputs as is done in the present invention. In FIG. 1, a focus lens 10 is shown receiving radiation from a remote object along a path generally identified by arrow 12. Lens 10 is mounted in a moveable housing, not shown, and proximate an aperture 13 formed in a member 14. A pair of lenslets 15 and 16 are mounted to receive radiation from the remote object through lens 10 along paths generally indicated by arrows 18 and 20. A first pair of detectors 22 and 24 are mounted behind lenslet 15 and receive an image of the exit pupil of lens 10 through lenslet 15. A second pair of detectors 26 and 28 are mounted behind lenslet 16 and receive an image of the exit pupil of lens 10 through lenslet 16. Detector pairs 22, 24 and 26, 28 are shown mounted along a common axis 29.

Figure 1A:
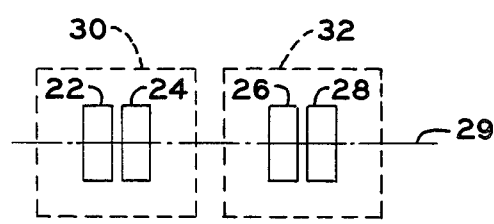
FIG. 1a shows the detector pairs of FIG. 1 and an outline of the area of radiation they receive.

FIG. 1a shows a front view of the detector pairs 22, 24 and 26, 28 and shows, by means of dashed lines 30 and 32, the outline of the exit pupil of lens 10 transmitted through aperture 13 of FIG. 1.

In theory, when the amount of radiation received by detector 22 is equal to the amount of radiation received by detector 24 and when the amount of radiation received by detector 26 is equal to the amount of radiation received by detector 28, lens 10 is considered to be in the proper focus position. As will be understood, however, if the detector 22 is not closely matched with the detector 24, or if the detector 26 is not closely matched with the detector 28, then when lens 10 is in the proper focal position, the outputs of the detector pairs will not be equal. This frequently occurs in practice and causes errors in the detection of the proper focus position.

Figure 2:
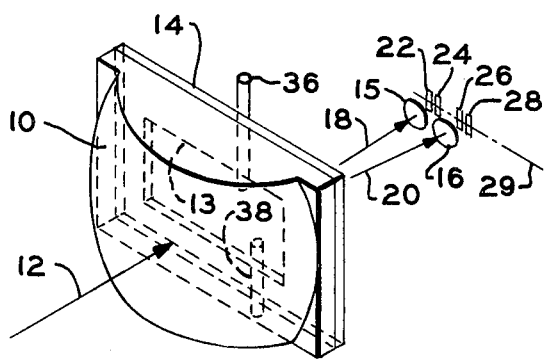
FIG. 2 shows, in a view like FIG. 1, an initial attempt to obscure portions of the radiation reaching the detectors by use of masking members.

One method of overcoming the problem of mismatched detectors is to provide masking means so as to obscure a portion of the radiation received by one of the detectors when both are receiving equal intensities and thereby match their outputs. FIG. 2 shows an initial attempt at such a masking arrangement. In FIG. 2, as in the other figures, the elements which are common to FIG. 1 have been given the same reference numerals. FIG. 2 differs from FIG. 1 in the provision of a pair of masking members 36 and 38 which may be tapes or screws mounted in the housing near the member 14 and moveable into the area adjacent aperture 13. As can be seen in FIG. 2, vertical movement of members 36 and 38 will cause them to extend into the area in back of aperture 13 and thereby block some of the radiation that is transmitted through lens 10 to the are of the detectors. The horizontal position of the members 36 and 38 is chosen so that each shadow will overlie at least a part of one of the detectors. Since both detector pairs receive an image of the same aperture, a shadow cast on a detector in one pair will also cast a shadow on the corresponding detector of the other pair. Since the detectors receive an image of the exit pupil of lens 10, defined by the aperture 13, mounting members 36 and 38 close to the aperture 13 assures that the image of the members 36 and 38 will be approximately focused and relatively sharp in the detector area. If the members were moved too close to the lenslets or were placed behind them, the shadow cast on one detector in a pair would become so fuzzy that it would also overlie the other detector in that pair and make individual adjustments more difficult.

Figure 2A:
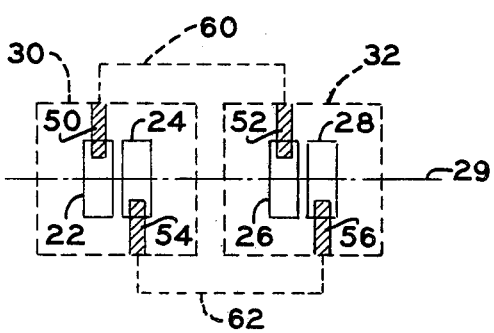
FIG. 2a shows the detector pairs of FIG. 2 and the positions of the shadows of the masking members thereon.

FIG. 2a shows the detectors like those were shown in FIG. 1a and the aperture images 30 and 32 surrounding them. It is seen in FIG. 2a that an image or shadow of masking member 38 appears on both detectors 22 and 26 as indicated by shaded areas 50 and 52 respectively. In similar fashion, the image or shadow of masking member 36 is shown in FIG. 2a by shaded areas 54 and 56 on detectors 24 and 28. It is seen that each of the shadows overlies a portion of one of the detectors thereby reducing its output. Since member 38 casts a shadow on both detectors 22 and 26, the shaded portions 50 and 52 are shown joined by a dashed line connection 60 and since member 36 casts a shadow on both detectors 24 and 28, the shaded portions 54 and 56 are shown joined by a dashed line connection 62. It can be seen that by moving member 38 vertically in FIG. 2, more or less of the detectors 22 and 26 may be shaded while moving member 36 vertically in FIG. 2, more or less of the detectors 24 and 28 may be shaded.

The difficulty with the arrangement of FIG. 2 and FIG. 2a lies in the fact that while detector 22's output may be greater than detector 24's output, so that obscuring more of detector 22's area will produce a match with detector 24, detector 26's output may be equal to or less than detector 28's output. Increasing amount of shadow on detector 22, increases the amount of shadow on detector 26 causing further mismatch between detector 26 and detector 28. Similarly, if the output of detector 24 was greater than the output of detector 22 and the output of detector 28 was equal to or less than the output of detector 26, the masking of more of detector 24 to match it with detector 22 would produce a greater mismatch of detector 28 with respect to detector 26.

Figure 3:
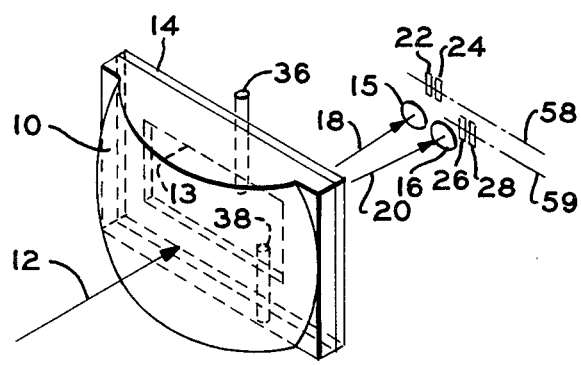
FIG. 3 shows, in a view like FIG. 1, a further attempt at using two masking members in which the detectors are slightly displaced.

FIG. 3 shows one attempt to overcome the problem presented by the apparatus of FIG. 2 wherein the detector pairs have now been purposely slightly displaced so that they lie along vertically spaced axes 58 and 59. The same effect could be obtained by slightly displacing the lenslets 15 and 16 in a vertical direction so that a line between their centers is skew to an axis such as axis 29 of FIG. 2 between the detector pairs 22, 24 and 26, 28. So long as each detector pair remains within the image outline of the aperture 13, their outputs are not affected by misaligning the detectors or lenslets, but the misalignment allows the shadow cast by member 38 to overlie detector 22 but not detector 26 and the shadow cast by member 36 to overlie detector 28 but not detector 24.

Figure 3A:
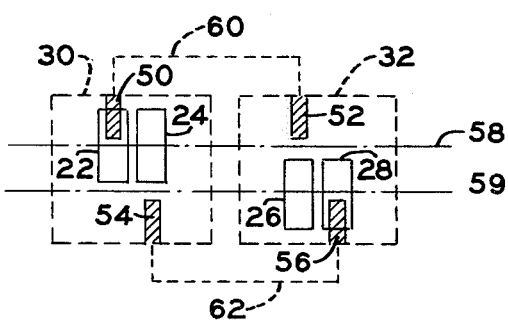
FIG. 3a shows the detectors of FIG. 3 and the position of the shadows of the masking members thereon.

FIG. 3a shows the detectors with the axes 58 and 59 displaced and it can be seen that detectors 22 and 24 are slightly higher and the detectors 26 and 28 are slightly lower than they were in FIG. 2a although all of the detectors are still within the outline of the image of the aperture 13. Again in FIG. 3a, the shadow cast by member 38 is shown as dark portions 50 and 52 again joined by a dashed line connection 60 to show that they move together and the shadow cast by member 36 is shown by darkened portions 54 and 56 again connected by a dashed line connection 62. Since detectors 22 and 24 are slightly higher than detectors 26 and 28, the dark portion 50 extends into detector 22 and thereby obscuring part of the radiation it receives, but the dark portion 52 does not extend into detector 26 since detector 26 is now too low to be obscured. Similarly, the offset of the detectors provides that the shadow 56 cast by member 36 obscures a portion of detector 28 while the shadow 54 does not obscure a portion of detector 24. Accordingly, by moving member 38 vertically in FIG. 3, detector 22 may be obscured without obscuring detector 26 and by moving member 36 vertically, detector 28 may be obscured without obscuring detector 24.

The difficulty with the arrangements of FIGS. 3 and 3a lies in the fact that, at the proper focus position, detector 24 may have a greater output than detector 22 while detector 26 may have a greater output than detector 28. In the arrangements of FIGS. 3 and 3a, attempts to obscure a greater portion of detector 24 to match detector 24 with respect to detector 22, results in a greater obscuration of detector 28 thus worsening the mismatch of detectors 28 and 26. Likewise, attempts to increase the obscuration of detector 26 will result in a greater obscuration of detector 22. Thus, as with the apparatus of FIGS. 2 and 2a, it will not be possible to balance both sets of detectors at the same time under certain conditions.

FIG. 4 shows an embodiment of the invention that overcomes the problems found in the previous figures. In FIG. 4, four separate moveable masking members, identified by reference numerals 70, 72, 74 and 76, are used mounted in the housing, not shown, and move in a vertical direction into the area adjacent aperture member 13. Again, as in FIG. 3, the detectors 22 and 24 are offset slightly with respect to detectors 26 and 28 as seen by axes 58 and 59. The use of four adjustable members will cause shadows to be cast on both sides of each of the detectors although only one shadow obscures a portion of each detector and each of the obscuring shadows is separately adjustable.

FIG. 4a shows the detectors in an offset position as in FIG. 3a and again mounted to be within the radiation aperture images 30 and 32. In FIG. 4a, the shadow cast by member 76 is shown as darkened portion 80 overlying a portion of detector 22 and darkened portion 82 above and not obscuring detector 26. Shadows 80 and 82 are shown connected by a dashed line 82 to indicate that they move together. The shadow cast by member 72 is shown by darkened portion 90 under and not obscuring detector 22 and darkened portion 92 overlying a portion of detector 26. Shadows 90 and 92 are shown connected by a dashed line 93 to indicate that they move together. The shadow cast by member 70 is shown by darkened portion 94 under and not obscuring detector 24 and darkened portion 96 overlying a portion of detector 28. Shadows 94 and 96 are shown connected by a dashed line 97 to indicate that they move together. Again as in FIG. 3, detectors 22 and 24 are mounted slightly higher within the aperture image 30 than detectors 26 and 28 are mounted within the aperture image 32. In FIG. 4a, it can be seen that by adjusting member 76, one may obscure a portion of detector 22 without obscuring a portion of detector 26, that by adjusting member 74 one may obscure a portion of detector 24 without obscuring a portion of detector 28, that by adjusting member 72 one may obscure a portion of detector 26 without obscuring a portion of detector 22 and that by adjusting member 70, one may obscure a portion of detector 28 without obscuring a portion of detector 24. Thus, each of the individual detectors may be separately partly obscured and the adjustments to members 70, 72, 74 and 76 may be made to match the output of detector 22 with that of detector 24 and the output of detector 26 with that of detector 28 and thus assure that the system will be properly in balance at the proper focus position.

FIGS. 5, 5a, 6 and 7 show an alternate embodiment of the invention enabling initial adjustment of individual detectors so as to match detector pair outputs. In FIG. 5, the lens 10 is shown partly cut away so as to expose the aperture 13 adjusting mechanism. In FIG. 5, a rounded plate 101 is shown which is connected to the housing, not shown, and near the member 14. A pair of masking film strips or tapes 103 and 104, better seen in FIG. 6, are mounted for sliding movement between member 101 and member 14. The configuration of the masking strips 103 and 104 is seen in FIG. 6 wherein the two strips have wide portions in areas identified by reference numerals 105, 106, 107 and 108 and further have narrow portions in areas identified by reference numerals 109 and 110 respectively. The narrow portions 109 and 110 are made of such width that they will not obscure any portion of the radiation passing through lens 10 and striking detectors 22, 24, 26 or 28. However, the thick portions 105, 106, 107 and 108 are of such thickness that they will obscure a portion of the light striking the detectors in a manner which will be described in connection with FIG. 5a. Holes, such as 111, 112, 113 and 114, are shown on the ends of tapes 103 and 104 for purposes of accommodating a tool useful in adjusting the positions of the tapes.

In FIG. 5a, the detectors 22, 24, 26 and 28 are again shown within the aperture images 30 and 32 and are offset as is seen by the vertical displacement of axes 58 and 59. The shadow cast by tape 104 is shown by a darkened portion 115 obscuring a portion of detectors 22 and 24 and by darkened portion 118 above and not obscuring detectors 26 and 28. Shadows 115 and 118 are shown connected by a dashed line 120 to indicate that they move together. Similarly, the shadow cast by tape 103 is shown by a darkened portion 122 below and not obscuring detectors 22 and 24 and by a darkened portion 124 obscuring a portion of detectors 26 and 28. Darkened portions 122 and 124 are shown connected by a dashed line 126 to show that they move together. It is seen in FIG. 5a, that with detectors 22 and 24 again displaced upwardly in their image of the aperture 30 and with detectors 26 and 28 displaced downwardly in their image of the aperture 32, when tape 104 casts shadow 115 on detectors 22 and 24, partially obscuring the upper and lower corners thereof, the corresponding shadow 118 will not obscure any portion of detectors 26 and 28. Similarly, the shadow 124, cast by tape 103, on detectors 26 and 28 obscuring a portion of the lower corners thereof, the corresponding shadow 122 will not affect any portion of detectors 22 and 24. Thus it can be seen that by moving tape 104 around member 101, a greater or lesser obscuring of detector 22 can be had with respect to the obscuring of detector 24 and therefore the outputs of detectors 22 and 24 may be matched. It can also be seen that by moving tape 103, a greater or lesser obscuring of detector 26 with respect to detector 28 may be accomplished thereby matching the outputs of detectors 26 and 28. It has been found that the mismatch of detectors seldom exceeds about ten percent and accordingly, the maximum amount of obscuring of the detectors by moveable members 70, 72, 74 and 76 in FIG. 4 and by tapes 103 and 104 in FIG. 5 need not be more than about ten percent of the area of each detector. While this reduces the output available, a ten percent maximum reduction is not serious to the operation of the auto focus circuitry and is more than compensated for by the improved accuracy in locating the desired focus position.

Figure 7:
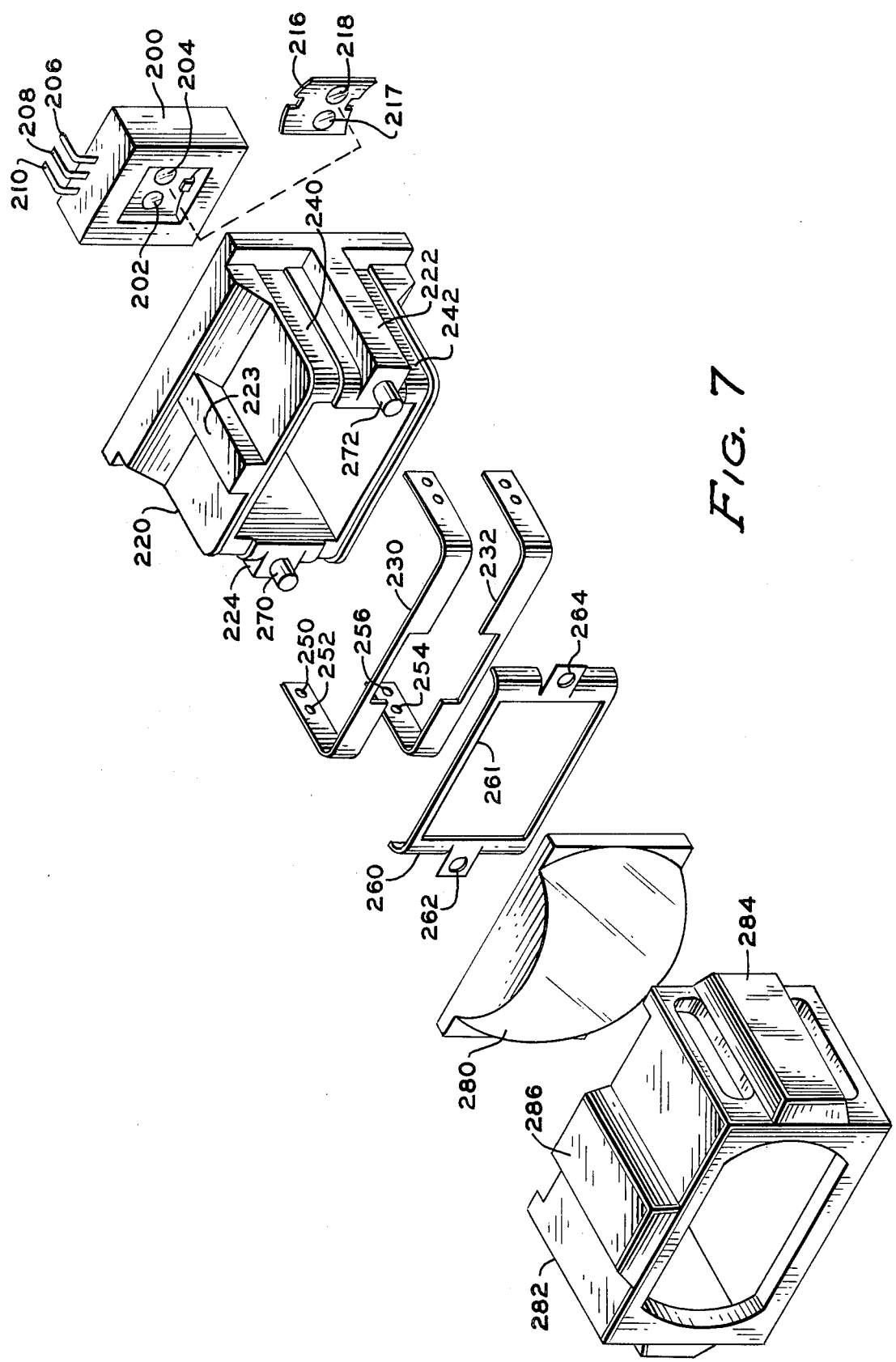
FIG. 7 shows an exploded view of an auto focus module utilizing the tape masking members of FIG. 5.

FIG. 7 shows an exploded view of a module constructed according to the teachings of FIGS. 5, 5a and 6. In FIG. 7, a first housing 200 is shown containing lenslets 202 and 204. Lenslets 202 and 204 may correspond to lenslets 15 and 16 in the previous figures. Detectors, such as 22, 24, 26 and 28, in the previous figures are mounted behind the lenslets 202 and 204, and while not visible in FIG. 7, are connected by conductors such as 206, 208 and 210 extending through housing 200 to the auto focus circuitry such as is shown in the above-mentioned copending applications. Lenslets 202 and 204 are overlayed by a snap member 216 which is curved to match the curvature of lens member 280 and which contains openings 217 and 218 to provide apertures for lenslets 202 and 204.

Housing 202 is made to fit within the back portion of a larger housing shown in FIG. 7 by reference numeral 220. Housing 220 is shaped so as to have three sliding abutments 222, 223 and 224 on the sides and top thereof. Two masking tapes 230 and 232, like those shown in FIG. 6, are adapted to slide against curved surfaces such as 240 and 242 on the housing 220. Holes, such as 250, 252, 254 and 256 are shown near the ends of tape members 230 and 232 to provide a means for sliding the tapes along the surfaces 240 and 242 respectively using a tool shaped to cooperate within the holes.

A member 260 is shown in FIG. 7 having an aperture 261 and mounting holes 262 and 264 which cooperate with a pair of extending abutments 270 and 272 on housing member 220. When assembled, member 260 is fastened on abutments 270 and 272 so as to press tapes 230 and 232 gently against the surfaces 240 and 242 of housing 220. With this arrangement, tapes 230 and 232 may be moved by applying force to the holes in the ends thereof and after the matching adjustments are made, the force of member 260 will retain the tapes in place.

A focus lens, shown in FIG. 7 by reference numeral 280, is fixedly mounted in a housing 282 which has internal apertures formed in abutments such as 284 and 286 to cooperate with the sliding abutments 222, 223 and 224 of the housing 220.

After the detector housing 200 is mounted in housing 220, tapes 230 and 232 are placed around surfaces 240 and 242 respectively and aperture member 260 is fixed thereover, the combination is placed into housing 282 and lens 280 may be moved back and forth with respect to the detectors behind lenslets 202 and 204. The assembled unit may then be placed in the auto focus circuitry with which it is to be used (for example the circuitry of the above-mentioned copending applications) and utilizing the test point terminals disclosed therein, which will be connected to the conductors such as 206, 208 and 210, a predetermined intensity of radiation may be transmitted to the detectors so that each detector receives the same amount simulating a focused condition. If the detectors are mismatched, tapes 230 and 232 will then be adjusted until the detector outputs are equal. Thereafter the auto focus circuits will operate in a satisfactory manner.

It is therefore seen that I have provided apparatus for individually adjusting the outputs of detectors in an auto focus arrangement so as to assure that the individual outputs of detector pairs will be the same when the focus lens is in the proper focus position. A number of alterations and changes may be made to the structures shown in the preferred embodiments and I do not wish to be limited by the specific disclosures used in connection therewith. I intend only to be limited by the following claims.

The embodiments of the invention in which an exclusive property or right is claimed are defined as follows:

1. Apparatus for adjusting the outputs of a first and a second pair of radiation detectors receiving radiation from a remote object through a lens in first and second paths respectively comprising:

positioning means mounting the first pair of detectors to receive a first image of the exit pupil of the lens and mounting the second pair of detectors to receive a second image of the exit pupil of the lens, the position of the first pair of detectors in the first image being displaced from the position of the second pair of detectors in the second image;

first adjustable means positioned to be moveable into the first path and operable to block a portion of the radiation received by a first detector in the first pair while not blocking a portion of the radiation received by either detector in the second pair; and second adjustable means positioned to be moveable into the second path and operable to block a portion of the radiation received by a first detector in the second pair while not blocking a portion of the radiation received by either detector in the first pair.

2. Apparatus according to claim 1 wherein said first adjustable means is further operable to block a portion of the radiation received by a second detector in the first pair while not blocking a portion of the radiation received by either detector in the second pair; and said second adjustable means is further operable to block a portion of the radiation received by a second detector in the second pair while not blocking a portion of the radiation received by either detector in the first pair.

3. Apparatus according to claim 1 wherein the positioning means mounts the first pair of detectors along a first axis and the second pair of detectors along a second axis displaced from the first axis.

4. Apparatus according to claim 1 wherein the positioning means includes a first lenslet mounted in the first path and a second lenslet mounted in the second path and positions so that a line between the centers of the first and second lenslets is skew to a line between the centers of the first and second pairs of detectors.

5. The method of balancing the outputs of a first pair of radiation responsive detectors mounted to receive a first image of the exit pupil of a focus lens and balancing the outputs of a second pair of radiation responsive detectors mounted to receive a second image to the exit pupil of the focus lens comprising the steps of:

displacing the first pair of detectors in the first image with respect to the second pair of detectors in the second image;

exposing the detectors in the first and second pairs to equal amounts of radiation;

placing first opaque means between the focus lens and the detectors so as to cast a shadow on a portion of the detectors in the first pair but not on the detectors in the second pair;

placing second opaque means between the focus lens and the detectors so as to cast a shadow on a portion of each of the detectors in the second pair but not on the detectors in the first pair; and moving the first and second opaque means to first and second positions respectively where the outputs of the detectors in the first and second pairs are substantially equal.

6. The method of claim 5 wherein the step of displacing the first pair of detectors in the first image with respect to the second pair of detectors in the second image comprises the step of mounting the first pair of detectors along an axis displaced from an axis along which the second pair of detectors is mounted.

7. The method of claim 5 wherein the step of displacing the first pair of detectors in the first image with respect to the second pair of detectors in the second image comprises displacing the first image with respect to the second image.

8. The method of claim 7 wherein the step of displacing the first image with respect to the second image comprises placing a first lenslet between the focus lens and the first pair of detectors and placing a second lenslet between the focus lens and the second pair of detectors so that a line between the centers of the first and second lenslets is skew to a line between the centers of the first and second pair of detectors.

* * * * *